(12) United States Patent
Wyer et al.

(10) Patent No.: US 8,544,282 B2
(45) Date of Patent: Oct. 1, 2013

(54) TANK FLOW CENTER FOR CLOSED LOOP GEOTHERMAL SYSTEM

(76) Inventors: Thomas Wyer, Martinsville, IN (US); Demitri Gula, Bloomington, IN (US)

( * ) Notice: Subject to any disclaimer, the term of this patent is extended or adjusted under 35 U.S.C. 154(b) by 613 days.

(21) Appl. No.: 12/830,688

(22) Filed: Jul. 6, 2010

(65) Prior Publication Data

US 2012/0006042 A1 Jan. 12, 2012

(51) Int. Cl.
| F25B 45/00 | (2006.01) |
| F25B 27/00 | (2006.01) |
| F25D 23/12 | (2006.01) |
| F25D 17/04 | (2006.01) |
| A23L 3/36 | (2006.01) |
| B01D 19/00 | (2006.01) |
| B01D 3/42 | (2006.01) |
| F16K 21/18 | (2006.01) |
| F17D 1/00 | (2006.01) |
| B65D 90/02 | (2006.01) |
| B65D 1/24 | (2006.01) |

(52) U.S. Cl.
USPC ........ 62/77; 62/236; 62/260; 62/292; 62/303; 62/317; 62/238.7; 96/155; 96/204; 96/220; 95/241; 95/260; 95/262; 137/395; 137/396; 137/590; 137/592; 220/565; 220/501; 220/503; 220/555

(58) Field of Classification Search
USPC ............... 62/236, 260, 292, 303, 317, 238.7; 96/155, 204, 220; 95/241, 260, 262; 137/395, 137/396, 590, 592; 220/656, 501, 503, 555, 220/56

See application file for complete search history.

(56) References Cited

U.S. PATENT DOCUMENTS

| 2,944,405 | A | * | 7/1960 | Basore et al. ................. 62/48.2 |
| 3,606,982 | A | * | 9/1971 | Anderson ........................ 261/29 |
| 4,246,764 | A | * | 1/1981 | Papadakos ...................... 62/183 |
| 4,909,312 | A |   | 3/1990 | Bledenbach et al. |
| 4,911,229 | A |   | 3/1990 | McElroy |
| 4,993,457 | A | * | 2/1991 | Berfield ........................ 137/899 |
| 5,201,195 | A | * | 4/1993 | Gavlak et al. .................. 62/475 |
| 5,244,037 | A | * | 9/1993 | Warnke ..................... 165/104.31 |
| 5,762,119 | A | * | 6/1998 | Platz et al. ...................... 141/231 |
| 5,971,009 | A | * | 10/1999 | Schuetz et al. ............... 137/312 |
| 6,079,378 | A | * | 6/2000 | Taue et al. ................. 123/65 BA |
| 7,347,219 | B2 | * | 3/2008 | Gohde et al. .................. 137/613 |
| 2005/0016473 | A1 | * | 1/2005 | Ranganathan et al. .... 123/41.44 |
| 2005/0044870 | A1 | * | 3/2005 | Couillard ........................ 62/260 |

* cited by examiner

Primary Examiner — Frantz Jules
Assistant Examiner — Erik Mendoza-Wilkenfel
(74) Attorney, Agent, or Firm — Liell & McNeil

(57) ABSTRACT

A closed loop geothermal system has a fluid circulation loop that includes in series: a heat pump, a ground loop heat exchanger, a tank flow center and a circulation pump. The tank flow center includes a tank, a first valve, a second valve and a tank bypass line all mounted in a common housing. The tank may include a refill inlet that opens through a top surface of the housing. A cap may be attached to close the refill inlet. The tank flow center has the regular geothermal operation configuration, a system flush configuration, and a refill configuration. The tank flow center may be elevated above the circulation pump a distance to produce a water column that is greater than a minimum cavitation avoidance head pressure for the circulation pump.

19 Claims, 2 Drawing Sheets

TANK FLOW CENTER FOR CLOSED LOOP GEOTHERMAL SYSTEM

TECHNICAL FIELD

The present disclosure relates generally to closed loop geothermal heating and cooling systems, and more particularly to a tank flow center that permits easy servicing of the system and inhibits air from traveling from the ground loop heat exchanger to the circulation pump.

BACKGROUND

Closed loop geothermal systems typically consist of a heat pump (heating and/or cooling unit), a ground loop heat exchanger (which can be in many different configurations), and one or more pumps used to circulate the heat exchange fluid (which is usually water mixed with antifreeze). During initial system installation, the ground loop must be filled with liquid and purged of all air and debris. This is typically accomplished with an external pumping system known in the industry as a flush cart. The flush cart often consists of a one to two horsepower pump, valves for directing/controlling flow, a large supply container for supplying the flushing liquid, and hoses/fittings for coupling to the geothermal system. Many geothermal system manufacturers provide a packaged unit that consists of the necessary system circulating pump(s) along with valves and exposed ports for connection to a flush cart. The package units are often known in the industry as flow centers, flow controllers, loop pump modules, or pump packs. The valves are often three way, four position valves in the package center that enable the ground loop system to be isolated from the circulating pump(s) and the heat pump during initial system start up and any subsequent maintenance such as replacing a circulation pump. The valves and the exposed ports also allow a flush cart to be coupled to the geothermal system for filling, flushing and purging. Geothermal systems are often categorized as either being pressurized or unpressurized.

During initial system start up of traditional pressurized systems (after the filling, flushing and purging is complete) the return valve on the flush cart is closed, dead heading the pump against the closed valve. This drives up the pressure in the system as the pump draws a small amount of liquid from the flush cart reservoir and forces it into the system. The ground loop often consists of plastic pipe that flexes slightly allowing this additional liquid to enter the system. The flush cart operator watches the flush cart fluid supply container for a significant liquid level drop. If the water level in the supply tank drops significantly (maybe several inches or more) it may indicate that air is still in the system and is being compressed, and further flushing/purging may be necessary. Once the operator is confident that all air has been purged from the geothermal system, the flush cart is once again dead headed and the valves are turned to the operating position capturing the pressure in the system. This initial system pressure, which is provided by the flush cart pump, may be generally on the order of 40-60 psig. This trapped pressure provides the suction pressure required by the circulating pumps, and also allows for some pressure loss due to the relaxing of the plastic piping over time. If all air has been properly flushed from the system, and there are no leaks anywhere in the system, these pressurized geothermal systems will function for many years without any maintenance required.

This method of installation has been the dominate strategy since the geothermal industry was originally founded. However, if any air remains in the system and/or there is a small leak anywhere in the system, the system pressure will drop and the volume of trapped air will grow, due at least in part to the decrease in pressure. This build up of air can cause two modes of failure for the circulating pump(s). First, the air can migrate to the pump inlet and cause the pumps to become air locked. Since the loop fluid cools the circulating pump, an air locked pump will eventually overheat and fail. Second, if there is inadequate positive pressure on the suction side of the pump, cavitation can result and the pump will eventually fail.

Unpressurized systems have been gaining wider industry acceptance over the past several years. Unpressurized systems generally allow the installation to be less precise, thereby allowing a larger group of lesser skilled installers to offer closed loop geothermal heating and cooling systems to their customers. Since there is little to no system pressure relative to ambient pressure, piping connections do not necessarily have to be as leak proof as connections in their counterpart pressurized geothermal systems. Unpressurized systems typically allow for some air separation and often provide a strategy for make up water, rendering the necessity to purge air from the system not as critical as in pressurized installations. For instance, if there is a leak in a nonpressurized installation, the system owner (usually the homeowner) can easily add loop liquid to the system without the use of specialized tools or equipment. Nevertheless, although unpressurized systems are generally considered more forgiving than their pressurized counterparts, the same types of system failures can also occur. For instance, if too much air finds its way to the pump inlet, the pump can still become air locked and eventually overheat and fail. In addition, if there is inadequate fluid pressure at the suction side of the pump, cavitation can still result and the pump will eventually fail.

The present disclosure is directed toward avoiding pump failures in geothermal systems in general, and especially unpressurized geothermal systems specifically.

SUMMARY OF THE DISCLOSURE

A closed loop geothermal system has a fluid circulation loop that includes in series: a heat pump, a ground loop heat exchanger, a tank flow center and a circulation pump. The tank flow center includes a tank, a first valve, a second valve and a tank bypass line mounted in a housing. The tank has a refill inlet that opens through a top surface of the housing. The tank flow center has a regular geothermal operation configuration in which a cap is attached to close the refill inlet, and a refill configuration in which the cap is detached from the refill inlet of the tank. The tank flow center also has a system flush configuration.

In another aspect, a method of installing a closed loop geothermal system includes mounting a tank flow center at an elevation above a circulation pump a distance to produce a water column that is greater than a minimum cavitation avoidance head pressure for the circulation pump. A heat pump, a ground loop heat exchanger, the tank flow center and a circulation pump are fluidly connected in series. The ground loop heat exchanger is flushed while the tank flow center is in a system flush configuration in which a tank of the tank flow center is bypassed via a bypass line. A refill inlet through a top of the housing of the tank flow center may be opened to partially fill the tank with liquid, and then the refill inlet is closed. The tank flow center is then changed from a system flush configuration to a regular geothermal operation configuration after the flushing and closing steps.

In still another aspect, a tank flow center includes a tank mounted in a housing that includes a refill inlet that opens through a top side of the housing. A removable cap is covering the refill inlet. A first valve is mounted to the housing and has an inlet port that opens outside the housing for fluid connection to a ground loop heat exchanger, a tank port fluidly connected to the tank, and a bypass port fluidly connected to a bypass line. A second valve is mounted to the housing and has an outlet port that opens outside the housing for fluid connection to a circulation pump, a tank port fluidly connected to the tank, and a bypass port fluidly connected to the bypass line.

DETAILED DESCRIPTION

Figure 1:
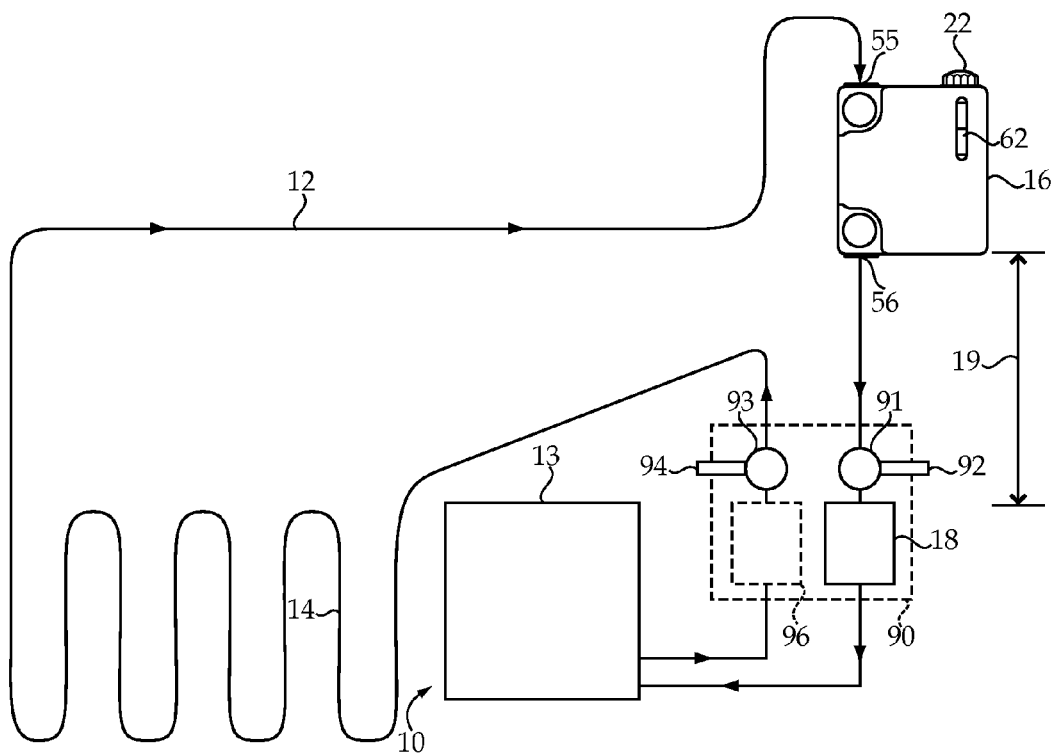
FIG. 1 is a schematic view of a closed loop geothermal system according to one aspect of the present disclosure.
Figure 2:
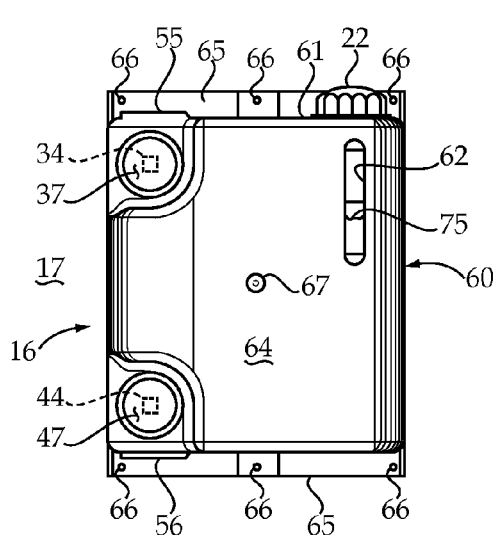
FIG. 2 is a front view of a tank flow center of the geothermal system of FIG. 1.

Referring to FIGS. 1-4, a closed loop geothermal system 10 has a fluid circulation loop 12 that includes in series: a heat pump 13, a ground loop heat exchanger 14, a tank flow center 16 and a circulation pump 18. The tank flow center 16 includes a tank 20, a first valve 30, and second valve 40 and a tank bypass line 50 all mounted in a common housing 60. Preferably, all of the various components of tank flow center 16 are made from noncorrosive materials, such as plastic and the like. Tank 20 may include a refill inlet 21 that opens through a top surface 61 of housing 60. The tank flow center 16 may have a regular geothermal operation configuration in which a cap 22 is attached to close refill inlet 21, and valves 30 and 40 are positioned to route the circulating liquid through tank 20 while avoiding bypass line 50. Tank flow center 16 may also have a system flush configuration in which valves 30 and 40 are positioned to route liquid through bypass line 50 while avoiding tank 20. Finally, tank flow center 16 may have a refill configuration in which cap 22 is detached from refill inlet 21 to allow a user to add make up liquid into tank 20 to a desired level. When closed loop geothermal system 10 is installed in an unpressurized configuration, tank flow center 16 may be elevated above circulation pump 18 a distance 19 to produce a water column that is greater than a minimum cavitation avoidance head pressure for circulation pump 18. For instance, tank flow center 16 may be mounted on a vertical wall surface 17 above circulation pump 18.

Although not necessary, cap 22 can be a commercially available cap that includes an internal pressure relief valve 24. For instance, the pressure relief valve may be set to open when pressure within system 10 exceeds some predetermined pressure such as 13-15 psig. In addition, cap 22 may also be equipped to include a vacuum relief valve to protect tank 20 from collapse in the event that pressure within system 10 drops below ambient pressure. In the illustrated embodiment, cap 22 includes a pressure relief valve 24 operable to open the tank when an absolute pressure differential on opposite sides of the cap exceed a predetermined pressure, whether that pressure differential be a vacuum or overpressurization. It is this feature of the invention that may allow tank flow center 16 to be mounted at a lower distance above circulation pump 18 providing a lower water column pressure on the inlet of the circulation pump, but compensating by pressurizing the system to a level below which the pressure relief valve 24 will open.

In one embodiment, tank 20 may be formed from an HDPE translucent plastic and housing 60 may be shaped from opaque plastic to include a window 62 so that one may check the liquid level 75 in tank 20 without detaching cap 22 or otherwise altering system 10. Thus, a homeowner may quickly confirm that the liquid level 75 in tank 20 is at a proper level with merely a glance at tank flow center 16, and while geothermal system 10 is in operation. In an unpressurized configuration, liquid can be added to tank 20 while geothermal system 10 is in operation by detaching cap 20 and adding liquid to tank 20 up to a desired level indicated through window 62. In one embodiment, tank 20 may have a capacity on the order of 2.5 gallons and window 62 may be sized in a range to show a preferred liquid level in tank 20 on the order of 2 gallons plus or minus half a gallon. Those skilled in the art will appreciate that the size and markings associated with window 62 may indicate to a homeowner that adequate liquid is in system 10 whenever the liquid level 75 appears in window 62.

Figure 4:
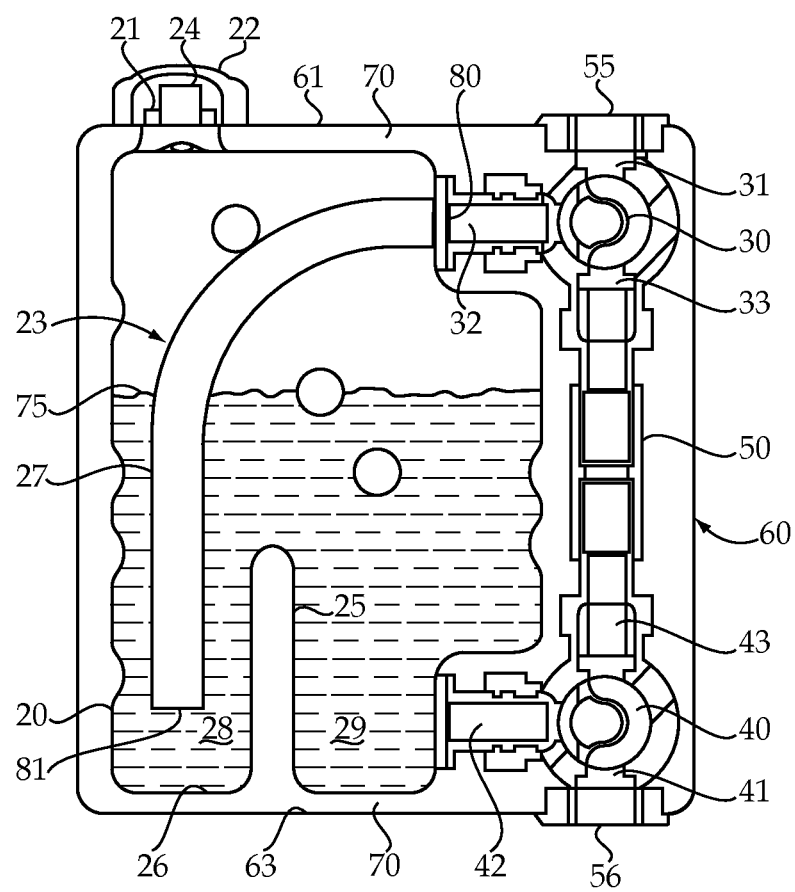
FIG. 4 is an internal view of the tank flow center of FIGS. 2 and 3 as views along section lines 4-4 of FIG. 3.

In order to inhibit air from escaping from tank 20 toward circulation pump 18, tank 20 includes internal flow directing geometry 23. Internal flow directing geometry 23 is shaped, sized and configured to inhibit air entering tank 20 from the ground loop heat exchanger 14 from escaping from the tank 20 to the circulation pump 18. In the illustrated embodiment, this internal flow directing geometry 23 includes an internal flow directing tube 27 that connects on one end 80 to a tank port 32 of first valve 30, and opens at its other end 81 into one side 28 of a baffle 25 that divides the lower portion of tank 20 as shown in FIG. 4. Since outgoing liquid from tank 20 leaves from the opposite side 29 of baffle 25 into tank port 42 of second valve 40, air bubbles that arrive into tank 20 via flow directing tube 27 tend to percolate toward the top of the tank rather than being drawn into valve 40. In addition, any debris swept up through the ground loop heat exchanger 14 may settle on floor 26 of tank 20 after arriving through flow directing tube 27. Although the internal flow directing geometry 23 of the illustrated embodiment includes the flow directing tube 27 and a baffle 25 in tank 20, those skilled in the art will appreciate that many other geometries are available and known to those of ordinary skill in the art that could be properly characterized as being shaped, sized and configured to inhibit air from escaping tank 20 toward circulation pump 18. Thus, when valves 30 and 40 are positioned such that tank flow center 16 is in its regular geothermal operation configuration, liquid enters tank flow center through inlet 55 into inlet port 31 of valve 30 and out of tank port 32 into flow directing tube 27. At the same time, liquid is drawn from tank 20 from side 29 into tank port 42 of valve 40 toward outlet port 41 and eventually out of tank flow center 16 through outlet 56 toward circulation pump 18.

Access to change the configuration of first valve 30 and second valve 40 may be gained through the front side 64 of housing 60 by detaching a first removable cover 37 and a second removable cover 47 to reveal tool engagement surfaces 33 and 44 respectively. For instance, tool engagement surfaces 34 and 44 may have a hexagonal shape for receiving an allen wrench to rotate the internal valve member between different configurations to open different ports and provide different flow configurations through tank center 16. For instance, when the tank flow center 16 is put into a system flush configuration, valve 30 would be rotated to close tank port 32 and open inlet port 31 directly to bypass port 33. In addition, valve 40 would be rotated to close tank port 42 and open bypass port 43 directly to outlet port 41. As such, liquid entering inlet 55 would flow directly through valve 30, through bypass line 50, through valve 40 and out of outlet 56.

In one system configuration, a pump flow center 90 may include valves 91 and 93 with exposed ports 92 and 94 for fluid connection to an appropriate flush cart as described earlier. In some configurations, pump flow center 90 may also include a second circulation pump 96 that receives liquid from heat pump 13 and pumps the liquid through the ground loop heat exchanger 14. Nevertheless, those skilled in the art will appreciate that two circulation pumps may not be necessary in many installation applications. Those skilled in the art will appreciate that tank 20 is preferably bypassed during the flushing operation in order to avoid overpressurizing tank 20 or channeling too much debris and the like into tank 20 during a system flush configuration.

Figure 3:
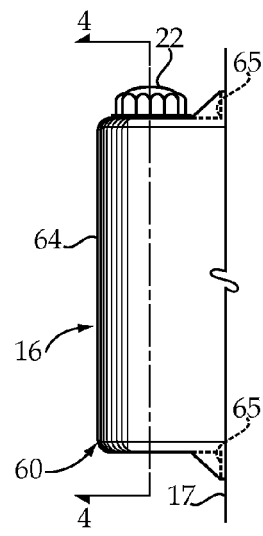
FIG. 3 is a side view of the tank flow center of FIG. 2.

In addition to those features previously described, tank flow center 16 may also include wall mounting flanges 65 that include fastener bores 66 to easily mount tank flow center 16 on a vertical wall surface 17, as shown in FIG. 3. In addition, housing 60 may be equipped with one or more spray foam holes 67 that allow foam insulation 70 to be injected or sprayed into housing 60 between internal surface 63 and tank 20 after tank flow center 16 has been assembled. After the foam insulation 70 has been added, spray foam hole(s) may be closed with a suitable cover or the like. This aspect of the tank flow center 16 may permit steady and problem free operation in colder climates and avoid condensation issues inside of housing 60.

INDUSTRIAL APPLICABILITY

The tank flow center 16 of the present disclosure finds general applicability in closed loop geothermal systems. The tank flow center 16 finds specific application in unpressurized systems, but can also find potential application in systems needing some pressurization in order to have adequate head pressure at the inlet to the circulation pump 18. Nevertheless, those skilled in the art will appreciate that the valve opening pressure for the pressure relief valve 24 in cap 22 could be selected so that tank flow center 16 could be utilized in current pressurized closed loop geothermal systems with internal pressures exceeding 40 psig, for example, without departing from the scope of the present disclosure.

At time of installation, an installer might consult the manufacturers suggestion for the desired head pressure at the inlet to the circulation pump 18. Using appropriate calculations, that pressure can be converted into a desired mounting distance 19 at which tank flow center 16 should be above circulation pump 18 to provide the desired minimum pressure to avoid cavitation. The tank flow center then can be mounted using the included wall mounting flanges 65 with appropriate fasteners such as wood screws or the like. Next, the various fluid connections for the fluid circulation loop could be facilitated by fluidly connecting in series the heat pump 13, the ground loop heat exchanger 14, the tank flow center 16 and circulation pump 18. Next, the tank flow center can be placed in its flush configuration to bypass tank 20 so that all of the liquid entering tank flow center travels through bypass line 50. Next, the flush cart would be fluidly connected to ports 92 and 94 of the pump flow center 90. The ground loop heat exchanger 14 would then be flushed by turning on the flush cart, with none of the flush liquid entering the tank 20 during flushing. In the illustrated embodiment, dead heading the flush cart into the tank 20 would be undesirable, as overpressurization might damage tank 20. After flushing is complete, the flush cart is turned off and the valves 91 and 93 are returned to their normal operation configuration. In addition, valves 30 and 40 of tank flow center are returned to their normal operation configuration so that liquid flows through tank 20 and not through bypass line 50. Next, the cap 22 may be detached from refill inlet 21 and the tank 20 filled to a desired level with clean debris free heat exchange liquid. For instance, tank 20 may be filled to an extent that places the liquid level 75 in the middle of window 62. Next, the circulation pump 18 can be started and operated for several minutes. Additional loop fluid can be added to tank 20 if necessary. The system is then ready for operation and the cap 22 is returned to cover refill inlet 21 and the replaceable valve covers 37 and 47 may be returned to cover the tool engagement surfaces 34 and 44 of valves 30 and 40, respectively.

The tank flow center 16 of the present disclosure provides numerous additional functions and benefits over current systems. Among these, are providing the necessary suction head pressure at the circulation pump due to appropriate mounting of the tank flow center 16 above the circulation pump 18. This insures a flooded pump housing volute and avoids the pump experiencing low pressures that could result in cavitation. In addition, the internal flow directing geometry 23 allows air to be separated from liquid, prevents air from being drawn into pump 18 or ground loop heat exchanger 14. This is accomplished in the illustrated embodiment by using a liquid path that returns the air/liquid mix on one side 28 of an internal baffle 25 while outgoing liquid leaves from the opposite side 29 of baffle 25. In addition, heavy debris such as sand that enters tank 20 may settle on the floor 26 of the tank rather than being directed toward pump 18, potentially damaging the same. In addition, tank 20 essentially functions as an expansion tank allowing the fluid level to rise and fall in the system 10 due to seasonal temperature fluctuations and the like. The valves 30 and 40 of tank flow center 16 also allow the ground loop heat exchanger 14 to be flushed with an external flush cart while bypassing tank 20. The translucent construction of tank 20 along with the window 62 and housing 60 allows the liquid level in the tank to be monitored at all times without opening the system. In addition, the refill inlet 21 and the cap 22 allow liquid to be manually added to system 10 when it falls below a predetermined level, without the need of special tools or skills. Cap 22 also seals system 10 from the outside environment. This may prevent air from continuously mixing with the liquid and prevents evaporation of the liquid, which can include antifreeze such as ethanol and methanol. In addition, closure of the cap can limit the presence of oxygen and therefore help avoid bacteria growth with another common antifreeze, namely propylene glycol. In addition, almost all antifreeze solutions are known to cause corrosion problems in the presence of oxygen if they are mixed with a mineralized or contaminated water source. The cap 22 may include a pressure relief valve 29 that allows pressure and vacuum relief to protect the tank from excessive expansion and/or collapse. Nevertheless, the system can still be pressurized up to the valve opening pressure of the pressure relief valve 24. The mounting flanges 65 also allow the tank flow center 16 to be easily wall mounted. In one version, the cap 22 and refill inlet opening are sized to be small to prevent a hand from being inserted into tank 20. Foam insulation 70 between the interior surface 63 of housing 60 and tank 20 can also inhibit condensation within the housing and allow for colder weather operation. By making the components of tank flow center all plastic or composite construction, corrosion can also be avoided. In one specific embodiment, no mechanical fittings (threads) are used, and the internal transitions are fused and sealed with o-rings to preempt potential problems associated with threaded connections. Because the tank flow center 16 is modular, it can be replaced without replacing the pump flow center 90, and the tank flow center 16 is retrofitable into current systems. Thus, by appropriate mounting height of tank flow center 16, a previously pressurized system that has leak problems, may be remedied, and converted into a non-pressurized system according to the present disclosure. The easy access to the liquid in the tank through refill inlet 21 also allows the loop fluid to be tested, such as for antifreeze concentration. Finally, by appropriately shaping the connection ports on tank 20 as well as housing 60 it can be constructed to accommodate both left and right hand version installations.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

LIST OF ELEMENTS

Title: Tank Flow Center for Closed Loop Geothermal System

File: Geo-Flo-1
10. geothermal system
12. fluid circulation loop
13. heat pump
14. ground loop heat exchanger
16. tank flow center
17. vertical wall surface
18. circulation pump
19. distance
20. tank
21. refill inlet
22. cap
23. flow direction geometry
24. pressure relief valve
25. baffle
26. floor
27. internal flow directing tube
28. one side
29. opposite side
30. first valve
31. inlet port
32. tank port
33. bypass port
34. tool engagement surface
37. removable cover
40. second valve
41. outlet port
42. tank port
43. bypass port
44. tool engagement surface
47. removable cover
50. bypass line
55. inlet
56. outlet
60. housing
61. top surface
62. window
63. internal surface
64. front side
65. wall mounting flange
66. fastener bore
67. spray foam hold
70. foam insulation
75. liquid level
80. one end
81. opposite end
90. pump flow center
91. valve
92. port
93. valve
94. port
96. pump

What is claimed is:

1. A closed loop geothermal system comprising:
    a fluid circulation loop that includes in series: a heat pump, a ground loop heat exchanger, a tank flow center and a circulation pump;
    the tank flow center including a tank, a first valve, a second valve and a tank bypass line mounted inside of a housing of the tank flow center;
    the tank having a refill inlet that opens through a top surface of the housing;
    the tank flow center having a regular geothermal operation configuration in which a cap is attached to close the refill inlet, a system flush configuration and a refill configuration in which the cap is detached from the refill inlet of the tank; and
    a vacuum relief valve that opens the tank to atmosphere when pressure in the tank is less than ambient pressure by a predetermined pressure differential.

2. The closed loop geothermal system of claim 1 wherein the tank flow center is elevated above the circulation pump a distance to produce a water column that is greater than a minimum cavitation avoidance head pressure for the circulation pump.

3. The closed loop geothermal system of claim 1 wherein the housing has a window to the tank for determining a range of fluid system levels while the tank flow center is in the regular geothermal operation configuration.

4. The closed loop geothermal system of claim 1 wherein the tank has an internal flow directing geometry shaped, sized and configured to inhibit air entering the tank from the ground loop heat exchanger from escaping from the tank to the circulation pump.

5. The closed loop geothermal system of claim 1 wherein fluid flow through the housing moves through the first valve, the bypass line and the second valve but not through the tank when the tank flow center is in the system flush configuration; and
    fluid flow through the housing moves through the first valve, the tank and the second valve but not through the bypass line when the tank flow center is in the regular geothermal operation configuration.

6. A closed loop geothermal system comprising:
    a fluid circulation loop that includes in series: a heat pump, a ground loop heat exchanger, a tank flow center and a circulation pump;
    the tank flow center including a tank, a first valve, a second valve and a tank bypass line mounted inside of a housing of the tank flow center;
    the tank having a refill inlet that opens through a top surface of the housing; and
    the tank flow center having a regular geothermal operation configuration in which a cap is attached to close the refill inlet, a system flush configuration and a refill configuration in which the cap is detached from the refill inlet of the tank;
    wherein the housing is mounted on a vertical wall surface;
    an internal surface of the housing and an external surface of the tank are separated by foam insulation; and
    the cap includes a pressure relief valve operable to open the tank when an absolute pressure differential on opposite sides of the cap exceed a predetermined pressure.

7. The closed loop geothermal system of claim 6 wherein the housing has a window to the tank for determining a range of fluid system levels while the tank flow center is in the regular geothermal operation configuration;
    wherein the tank has an internal flow directing geometry shaped, sized and configured to inhibit air entering the tank from the ground loop heat exchanger from escaping from the tank to the circulation pump;
    wherein fluid flow through the housing moves through the first valve, the bypass line and the second valve but not through the tank when the tank flow center is in the system flush configuration; and
    fluid flow through the housing moves through the first valve, the tank and the second valve but not through the bypass line when the tank flow center is in the regular geothermal operation configuration.

8. A method of installing a closed loop geothermal system, comprising the steps of:
    mounting a tank flow center at an elevation above a circulation pump a distance to produce a water column that is greater than a minimum cavitation avoidance head pressure for the circulation pump;
    fluidly connecting in series: a heat pump, a ground loop heat exchanger, the tank flow center and the circulation pump;
    flushing the ground loop heat exchanger while the tank flow center is in a system flush configuration in which a tank of the tank flow center is bypassed via a bypass line of the tank flow center;
    opening a refill inlet through a top of a housing of the tank flow center and partially filling the tank with liquid, then closing the refill inlet;
    changing the tank flow center from the system flush configuration to a regular geothermal operation configuration after the flushing and closing steps; and
    opening the tank to atmosphere through a vacuum relief valve when pressure in the tank is less than ambient pressure by a predetermined pressure differential; and
    wherein the opening the tank to atmosphere step includes opening the tank to atmosphere if an absolute pressure differential on opposite sides of a cap covering the refill inlet exceeds a predetermined pressure.

9. The method of claim 8 including a step of comparing a liquid level indicated through a window in the housing to a desired liquid level for the tank.

10. The method of claim 8 wherein the changing step includes rotating a first valve of the tank flow center from a first orientation to a second orientation, and rotating a second valve of the tank flow center from a first orientation to a second orientation.

11. The method of claim 8 including a step of trapping air in the tank that arrives in the tank from the ground loop heat exchanger when the circulation pump is running.

12. The method of claim 8 including trapping debris in the tank that arrives in the tank from the ground loop heat exchanger when the circulation pump is running.

13. The method of claim 12 including a step of comparing a liquid level indicated through a window in the housing to a desired liquid level for the tank;
    rotating a first valve of the tank flow center from a first orientation to a second orientation, and rotating a second valve of the tank flow center from a first orientation to a second orientation;
    trapping air in the tank that arrives in the tank from the ground loop heat exchanger when the circulation pump is running; and
    the opening step includes opening the tank to atmosphere if an absolute pressure differential on opposite sides of a cap covering the refill inlet exceeds a predetermined pressure.

14. A tank flow center for a closed loop geothermal system having a fluid circulation loop that includes in series: a heat pump, a ground loop heat exchanger, the tank flow center and a circulation pump, the tank flow center comprising:
    a housing;
    a tank mounted in the housing and including a refill inlet that opens through a top side of the housing;
    a removable cap covering the refill inlet;
    a vacuum relief valve that opens the tank to atmosphere when pressure in the tank is less than ambient pressure by a predetermined pressure differential;
    a first valve mounted to the housing and having an inlet port that opens outside the housing for fluid connection to the ground loop heat exchanger, a tank port fluidly connected to the tank, and a bypass port fluidly connected to a bypass line; and
    a second valve mounted to the housing and having an outlet port that opens outside the housing for fluid connection to the circulation pump, a tank port fluidly connected to the tank, and a bypass port fluidly connected to the bypass line.

15. The tank flow center of claim 14 wherein the housing includes a window to the tank for ascertaining a liquid level in the tank;
    the tank is formed from a translucent plastic material.

16. A tank flow center for a closed loop geothermal system having a fluid circulation loop that includes in series: a heat pump, a ground loop heat exchanger, the tank flow center and a circulation pump, the tank flow center comprising;
    a housing;
    a tank mounted in the housing and including a refill inlet that opens through a top side of the housing;
    a removable cap covering the refill inlet;
    a first valve mounted to the housing and having an inlet port that opens outside the housing for fluid connection to the ground loop heat exchanger, a tank port fluidly connected to the tank, and a bypass port fluidly connected to a bypass line inside of the housing; and
    a second valve mounted to the housing and having an outlet port that opens outside the housing for fluid connection to the circulation pump, a tank port fluidly connected to the tank, and a bypass port fluidly connected to the bypass line;
    wherein the tank includes an internal baffle extending up from a floor of the tank;
    the tank includes an internal flow directing tube that opens at one end to the tank port of the first valve, and opens at an opposite end on one side of the baffle; and
    the tank port of the second valve opens to the tank on an opposite side of the baffle.

17. The tank flow center of claim 14 wherein the cap includes a pressure relief valve.

18. A tank flow center for a closed loop geothermal system having a fluid circulation loop that includes in series: a heat pump, a ground loop heat exchanger, the tank flow center and a circulation pump, the tank flow center comprising:
    a housing;
    a tank mounted in the housing and including a refill inlet that opens through a top side of the housing;
    a removable cap covering the refill inlet;
    a first valve mounted to the housing and having an inlet port that opens outside the housing for fluid connection to the ground loop heat exchanger, a tank port fluidly connected to the tank, and a bypass port fluidly connected to a bypass line inside of the housing; and a second valve mounted to the housing and having an outlet port that opens outside the housing for fluid connection to the circulation pump, a tank port fluidly connected to the tank, and a bypass port fluidly connected to the bypass line;

wherein the first valve includes a tool engagement surface exposed through a front side of the housing, and a first removable cover that covers the tool engagement surface; and the second valve includes a tool engagement surface through the front side of the housing, and a second removable cover that covers the tool engagement surface.

19. A tank flow center for a closed loop geothermal system having a fluid circulation loop that includes in series: a heat pump, a ground loop heat exchanger, the tank flow center and a circulation pump, the tank flow center comprising;

a housing;

a tank mounted in the housing and including a refill inlet that opens through a top side of the housing;

a removable cap covering the refill inlet;

a first valve mounted to the housing and having an inlet port that opens outside the housing for fluid connection to the ground loop heat exchanger, a tank port fluidly connected to the tank, and a bypass port fluidly connected to a bypass line inside of the housing; and a second valve mounted to the housing and having an outlet port that opens outside the housing for fluid connection to the circulation pump, a tank port fluidly connected to the tank, and a bypass port fluidly connected to the bypass line;

wherein the housing includes first and second wall mounting flanges that each include a plurality of fastener bores;

foam insulation between an inner surface of the housing and the tank;

the housing includes a window to the tank for ascertaining a liquid level in the tank;

the tank is formed from a translucent plastic material;

the tank includes an internal baffle extending up from a floor of the tank;

the tank includes an internal flow directing tube that opens at one end to the tank port of the first valve, and opens at an opposite end on one side of the baffle; and the tank port of the second valve opens to the tank on an opposite side of the baffle;

the cap includes a pressure relief valve;

the first valve includes a tool engagement surface exposed through a front side of the housing, and a first removable cover that covers the tool engagement surface; and the second valve includes a tool engagement surface through the front side of the housing, and a second removable cover that covers the tool engagement surface.

* * * * *